United States Patent [19]
Kim

[11] Patent Number: 5,666,342
[45] Date of Patent: Sep. 9, 1997

[54] UNITED TAPE AND DISC RECORDING/REPRODUCING DEVICE HAVING A UNITED INSERTING PART

[75] Inventor: Ho-Geol Kim, Kyeonggi-Do, Rep. of Korea

[73] Assignee: Daewoo Electronics Co., Ltd., Seoul, Rep. of Korea

[21] Appl. No.: 528,248

[22] Filed: Sep. 14, 1995

[30] Foreign Application Priority Data

Sep. 19, 1994 [KR] Rep. of Korea .................. 94-23112

[51] Int. Cl.$^6$ .................................................. G11B 33/02
[52] U.S. Cl. ........................................ 369/75.2; 360/98.04
[58] Field of Search ........................... 369/75.2, 77.2, 369/77.1, 13; 360/98.04, 99.06, 98.06, 132, 98.05

[56] References Cited

U.S. PATENT DOCUMENTS

| | | | |
|---|---|---|---|
| 4,779,156 | 10/1988 | Ohta | 360/132 |
| 5,299,185 | 3/1994 | Sakurai et al. | 369/75.2 |
| 5,301,176 | 4/1994 | Kawachi et al. | 369/75.2 |
| 5,301,177 | 4/1994 | Kumakura | 369/75.2 |

*Primary Examiner*—Ali Neyzari
*Attorney, Agent, or Firm*—Beveridge, DeGrandi, Weilacher & Young LLP

[57] ABSTRACT

An inserting part is provided at a front side of a body of a united recording/reproducing device for inserting a cassette tape and an optical disc. A tape driving part and a disc driving part are installed inside of the body. The tape driving part has a tape recorder deck and a holder. The tape recorder deck is provided with a running system having a head drum at an inside of the body and the holder is provided for placing the tape on said tape recorder deck. The disc driving part has a disc tray, a disc deck, a disc tray transferring apparatus, and a disc deck rotating apparatus. The disc tray is provided for receiving the disc, the disc deck being for placing the disc transferred by the disc tray on the disc deck. The disc tray transferring apparatus is provided with gear groups installed on the disc deck and the body and a rack formed at the disc tray to be engaged with the gear groups, and the disc deck rotating apparatus is rotatably connected to a side of the interior of the body and rotated simultaneously with transferring of the disc tray to transfer the disc deck to a loading position.

12 Claims, 3 Drawing Sheets

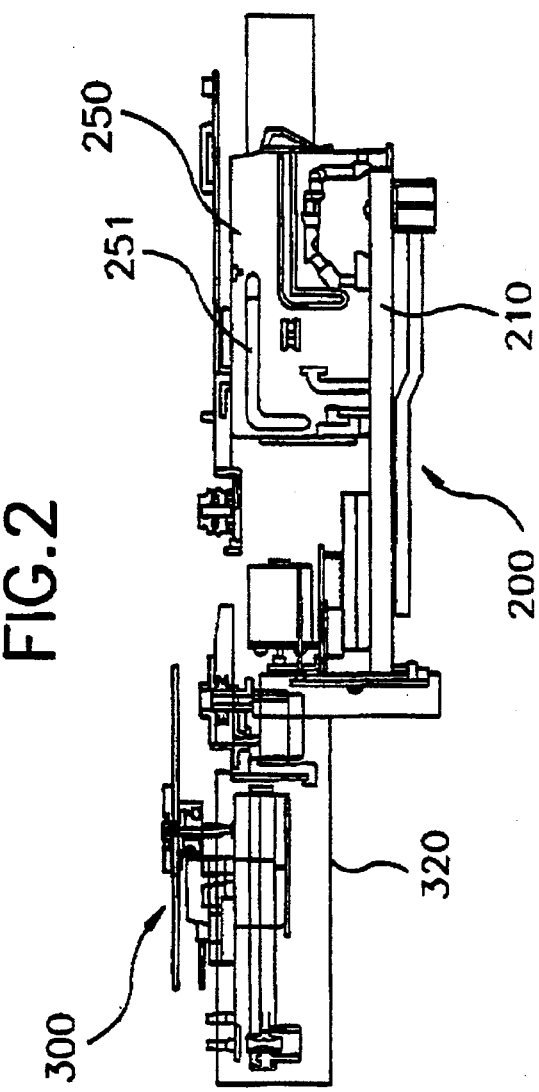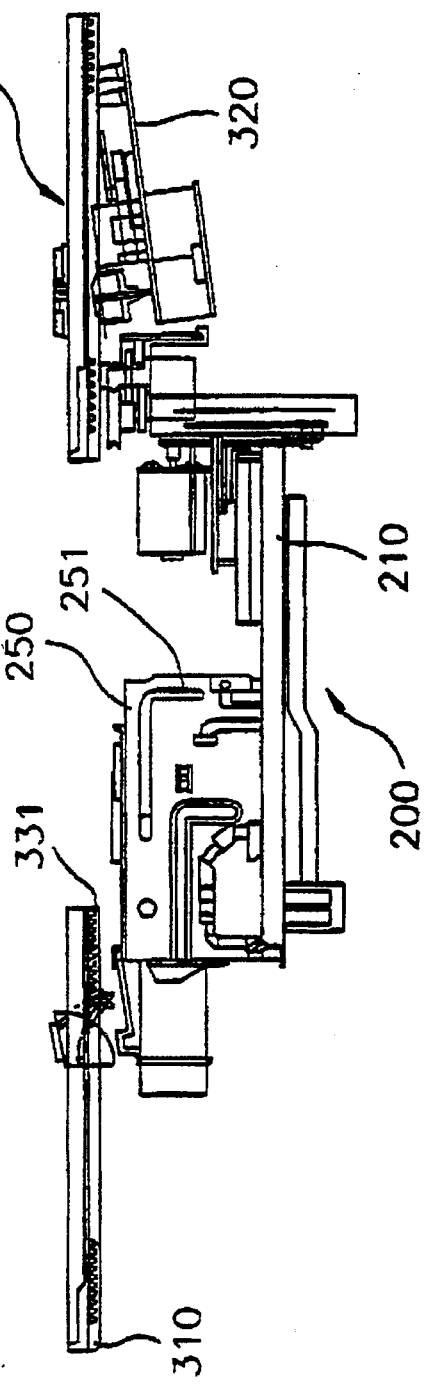

UNITED TAPE AND DISC RECORDING/REPRODUCING DEVICE HAVING A UNITED INSERTING PART

BACKGROUND OF THE INVENTION

1. Field of the Invention

The present invention relates to a united tape and disc recording/reproducing device having a united inserting part, and more particularly, a united recording/reproducing device for recording and playing selectively an optical disc player and a tape recorder.

2. Description of the Prior Arts

There are a tape player, a disc player, etc., as information recording/reproducing devices which are recently generalized.

The tape player is the device for recording information on and/or reproducing information from tape of magnetic or optical recording type such as cassette tape and video tape, and the disc player is the device for recording information on and/or reproducing information from disc of magnetic or optical recording type such as optical video disc, digital audio disc, compact disc, mini-disc, etc.

Since the tape player and optical disc player (e.g., CD player) are quite different from each other in operating mechanism, they have different bodies, and on the one side of the body of the disc player a disc inserting part is formed and on the one side of the body of the tape player a tape inserting part is formed, respectively.

In order to carry out the recording or playback for the tape recorder and the optical disc player, the recording or playback of the devices are carried out on the state which the tape and the disc are inserted through inserting openings.

There are recently trending toward convenience in use, simplification of required constituent elements and design, and miniaturization of product by integrating interrelated products.

For example, in case of the disc player, Katsuichi Sakurai et al. proposed a disc player capable of reproducing both a naked disc and a cartridge-encased disc, in which the discs are the same size, in E.P. Publication 525201 A2 (corres. U.S. Pat. No. 5,299,185). Also, Hideo Kawachi et al. proposed the disc player capable of reproducing both a naked disc and a cartridge-encased disc, in which the discs are the same size, in E.P. Publication 518259 A3 (corres. U.S. Pat. No. 5,301,176).

In the above Hideo Kawachi et al. patent, there is disclosed an apparatus for elevating the spindle assembly wherein one side of a chassis supporting the spindle assembly is fixed to a main chassis of the disc player and the spindle assembly can be moved up and down in a radial direction centering around the fixing point.

Thus, the naked disc and the cartridge-encased disc in which the discs are the same size are operated by a single modified operating device, which contributes to reduction of required constituent elements and miniaturization of product.

In contrast, in case of a tape recorder and an optical disc player, since they are different from each other in operating mechanism, it is necessary to provide an united recording/reproducing device having inventive integral construction which has different operating parts to the tape recorder and the optical disc player respectively, and which is constructed in consideration of interrelationship between the parts.

SUMMARY OF THE INVENTION

The present invention is intended to overcome the above-mentioned and numerous other disadvantages and deficiencies of the prior art.

Therefore, it is a first object of the present invention to provide a united tape and disc recording/reproducing device having a united inserting part in which respective operating parts for operating a tape and a disc player are integrally constructed.

It is a second object of the present invention to provide a united tape and disc recording/reproducing device having a united inserting part which is capable of inserting a disc and a tape through a single inserting part.

It is a third object of the present invention to provide a united tape and disc recording/reproducing device having a united inserting part which construction of a product is simplified and its entire size is miniaturized.

To achieve the above-described objects of the present invention, there is provided an united recording/reproducing device comprising:

a body having an inserting part provided at a front side of the body for inserting a cassette tape and an optical disc;

a tape driving part having a tape recorder deck and holder, the tape recorder deck being provided with a running system having a head drum at an inside of the body and the holder being provided for placing the tape on the tape recorder deck; and, a disc driving part having a disc tray, a disc deck, disc tray transferring apparatus, and disc deck rotating apparatus, the disc tray being provided for receiving the disc, the disc deck being provided for placing the disc transferred by the disc tray on the disc deck, the disc tray transferring apparatus being provided with gear groups installed on the disc deck and the body and a rack formed at the disc tray to be engaged with the gear groups, and the disc deck rotating apparatus being rotatably connected to a side of the interior of the body and being rotated simultaneously with transferring of the disc tray to transfer the disc deck to a loading position.

The united recording/reproducing device of the present invention alternatively comprises guide grooves or guide projections on both sides of lower surface of the disc tray and on upper surface of the disc deck corresponding with the both sides for guiding a transference of the disk tray. And also, the united recording/reproducing device alternatively comprises guide grooves or guide projections on both sides of lower surface of the disc tray and on right and left guide plates of the body corresponding with the both sides for guiding a transference of the disk tray. The guide projections preferably have lozenge shapes in order to smoothly transfer the disc tray.

The disc tray transferring apparatus comprises a first gear group having a driving motor and a plurality of gears rotated by the driving motor; a second gear group installed on a path of the disc tray to be transferred, the second gear group in order to transfer the disc tray to an inside or outside of the body; a third gear group installed at spaced position with the second gear group on a path of the disc tray to be transferred, the third gear group belt pulley connected with the second gear group to be rotated by them; a rack formed on lower surface of the disc tray along a transferring direction of the disc tray to be engaged with the first, second, and third gear groups, whereby the disc tray transferring apparatus transfers the disc tray to the inside or an outside of the body. The disc deck rotating apparatus comprises a transferring plate and an auxiliary transferring plate, the transferring plate being successively moved with the disc tray transferring apparatus, being provided at an upper surface of the front of the disc deck, and having a rack formed along the right and left directions of the front of the disc deck so that the disc deck can be slidably moved to the right and left, and the auxiliary transferring plate being formed to be bent from the transferring plate, and having a sloped groove formed with a predetermined slope on the auxiliary transferring plate, thereby transfers the disc deck to a loading position;

the disc deck being provided with disc deck transferring projection projected from a side of the disc deck so that the disc deck can be slidably transferred along the sloped groove on the auxiliary transferring plate.

Furthermore, the transferring plate has a guide rod projected thereon, and the disc tray has a guide rail formed with a rectilinear groove and an orthogonal groove extended from the rectilinear groove, the rectilinear groove being installed at a corresponding position to the guide rod such that the guide rod can be rectilinearly moved along the transferring direction of the disc tray, and the orthogonal groove being extended from the rectilinear groove to be bent in an orthogonal state with the rectilinear groove, thereby the more stable transference of the disc tray and the disc deck can be achieved.

In accordance with the present invention, the united recording/reproducing device carries out the recording and/or playback operations by inserting the disc or the tape through the single inserting part. More particularly, in the transferring apparatus which the stroke of the long distance is required, since the belt is used, the size of the entire set is compactized, and thus the production cost can be down.

BRIEF DESCRIPTION OF THE DRAWINGS

The present invention may be better understood and its numerous objects and advantages will be more apparent to those skilled in the art by reference to the accompanying drawings in which:

FIG. 2 is a left side elevational view for showing the united recording/reproducing device of FIG. 1;

FIG. 3 is a right side elevational view for showing the united recording/reproducing device of FIG. 1;

description of the preferred embodiments

Hereinafter, the present invention will be described in detail with reference to the accompanying drawings.

Figure 1:
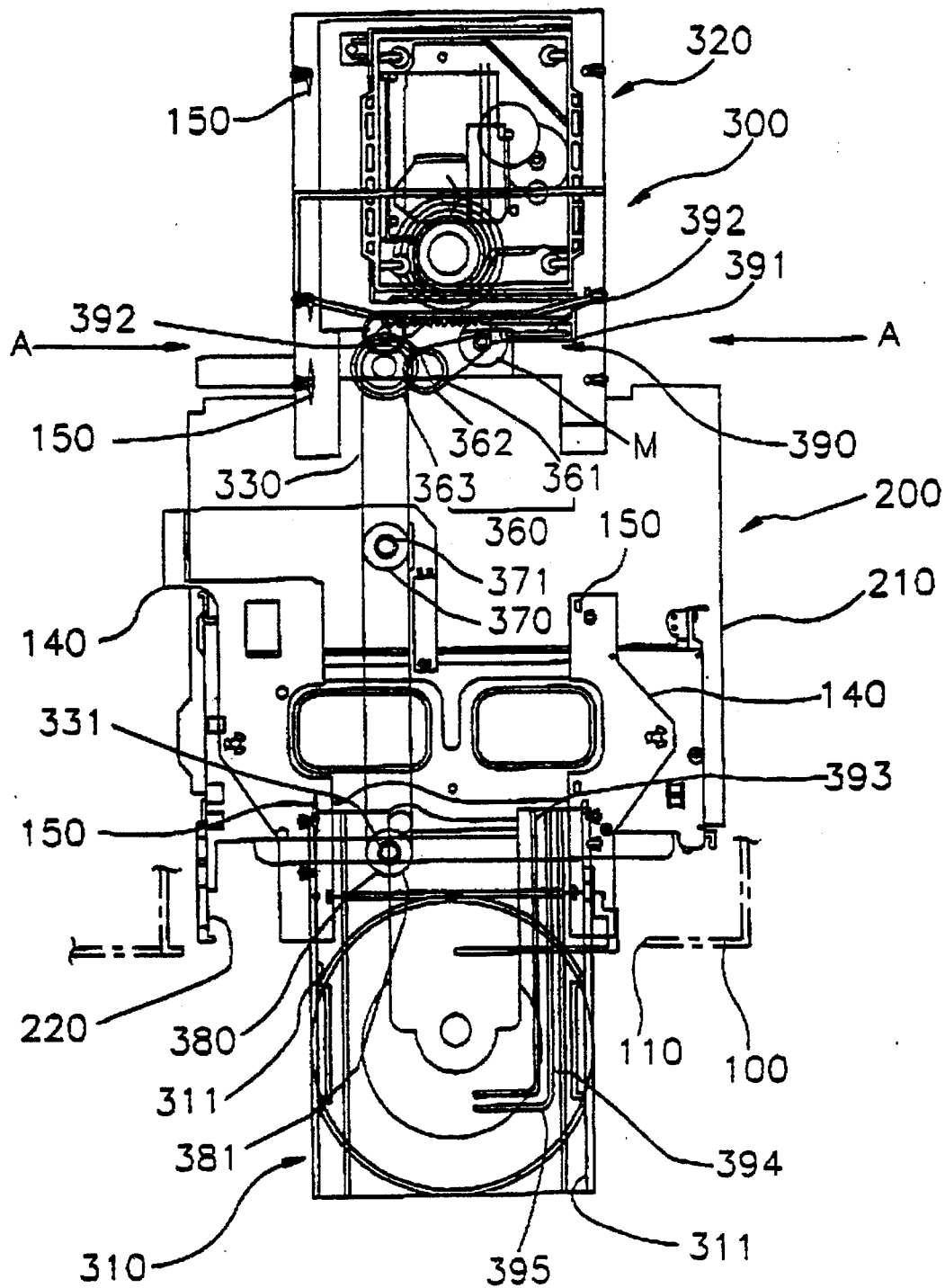
FIG. 1 is a schematic plan view for showing an united recording/reproducing device of the present invention.
Figure 4:
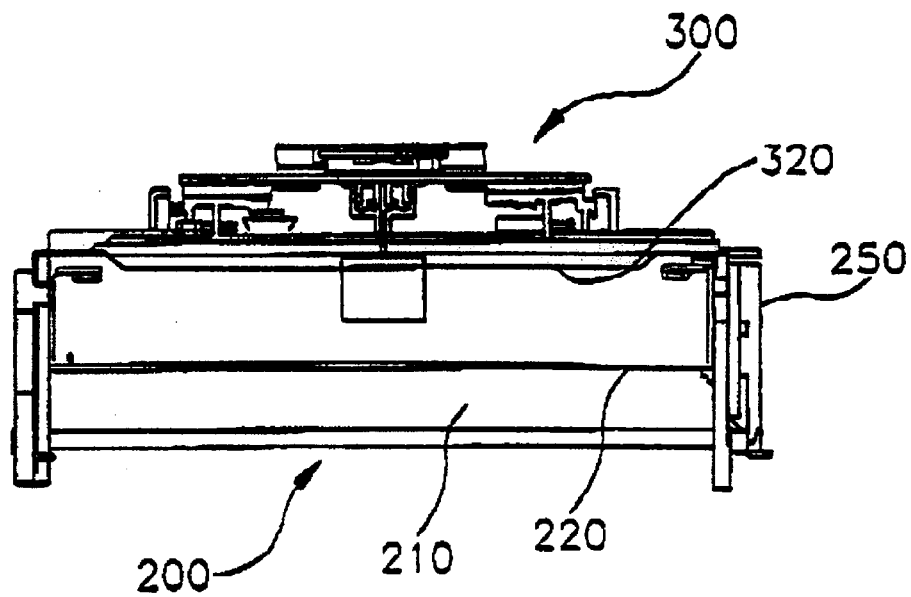
FIG. 4 is a front elevational view for showing the united recording/reproducing device of FIG. 1.
Figure 5:
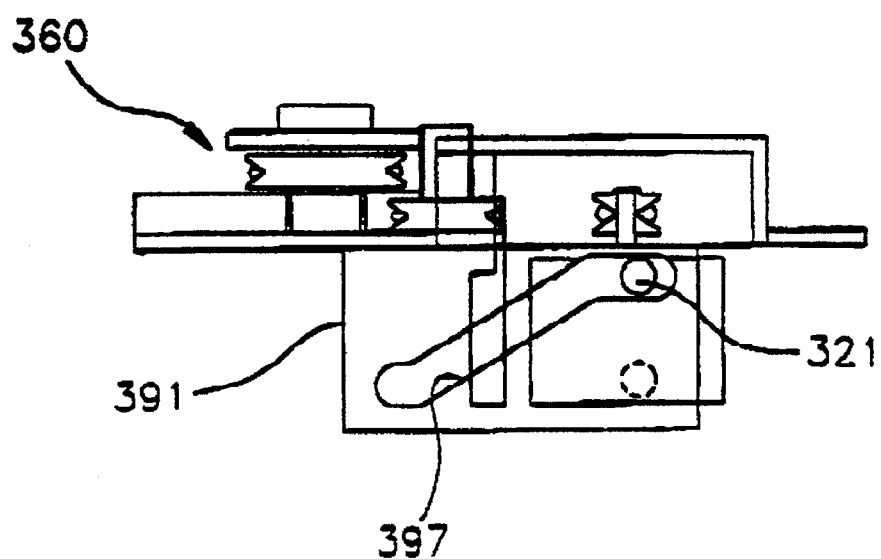
FIG. 5 is an enlarged partial view of a cross-section taken along the line A—A of the united recording/reproducing device of FIG. 1.

FIG. 1 is a schematic plan view for showing an united recording/reproducing device of the present invention, FIGS. 2 and 3 are respectively a right and left side elevational view of FIG. 1, and FIG. 4 is a front elevational view for showing the united recording/reproducing device of FIG. 1. FIG. 5 is an enlarged partial view of a cross-section taken along the line A—A of the united recording/reproducing device of FIG. 1.

As shown in FIG. 1, one part of a body 100 of an united recording/reproducing device of the present invention is shown in dotted line. A reference numeral 110 denotes an inserting opening provided at a front side of body 100 for inserting a cassette tape and an optical disc. A tape driving part 200 is provided at the inside of body 100 to drive the cassette tape. This tape driving part 200 is provided with a tape recorder deck 210 and a holder 220, tape recorder deck 210 being provided with a running system having a head drum (not shown), and holder 220 being provided for placing the tape on the tape recorder deck 210.

Meanwhile, a disc driving part 300 to drive an optical disc is provided at the back side of tape driving part 200. Disc driving part 300 is provided with a disc tray 310 in which guide grooves 311, 311 are formed on both sides of lower surface of disc tray 310 in order to transfer the disc to the inside or the outside of the body. This disc driving part 300 is also provided with a disc deck 320 for placing the disc transferred by disc tray 310 on disc deck 320. Moreover, disc driving part 300 is provided with a disc tray transferring apparatus 330 to transfer disc tray 310 to the inside or the outside of the body, and disc deck rotating apparatus 390 to transfer disc deck 320 to a loading position.

The disc transferred by disc tray 310 is placed in hinge joined state with one side of the body on disc deck 320 which is rotated by disc deck rotating apparatus 390.

Meanwhile, right and left guide plates 140, 140' are fixed on both sides of the upper surface of body 100 between tape driving part 200 and disc driving part 300. A plurality of guide projection 150, 150 . . . are projected from the predetermined positions of the right and left guide plates 140, 140' and the upper surface of disc deck 320, i.e., from the positions corresponding to guide grooves 311, 311 of disc tray 310. Guide projections 150, 150 . . . formed at the positions corresponding to guide grooves 311, 311 . . . of disc tray 310 of these guide projections 150, 150 . . . preferably have lozenge shapes in order to smoothly transfer disc tray 310. Thereby, the friction between guide grooves 311, 311 . . . of disc tray 310 and guide projections 150, 150 . . . formed at the positions corresponding to them is minimized so that disc tray 310 can be smoothly slid by guide projections 150, 150 . . . .

On the other hand, disc tray transferring apparatus 330 has first, second and third gear groups 360, 370, and 380 installed on disc deck 320 or body 100, and also a disc tray transferring rack formed on lower surface of disc tray 310 to be engaged with gear groups 360, 370, and 380. That is, disc tray transferring apparatus 330 has the first gear group 360 having a driving motor M and a plurality of gears 361, 362, 363 rotated by this driving motor M in order to transfer disc tray 310 to the inside or an outside of body 100. Disc tray transferring apparatus 330 has also the second gear group 370 installed on a path of disc tray 310 to be transferred. For example, second gear group 370 may be provided at the upper surface of left guide plate 140 of the above mentioned right and left guide plates 140, 140'. A gear 371 of the second gear group 370 is belt pulley connected with last gear 363 to be rotated by last gear 363. A third gear group 380 is installed at spaced position on body 100 with the second gear group 370 on a path of disc tray 310 to be transferred. Third gear group is belt pulley connected with second gear group 370 to rotate them.

Rack 331 is formed on lower surface of disc tray 310 along a transferring direction of disc tray 310 to be engaged with first, second, and third gear groups 360, 370, and 380. Thus, each gear 361, 362, 363, 371, or 381 of gear group 360, 370, and 380 is rotated in engagement with rack 331 of lower surface of disc tray 310, whereby disc tray transferring apparatus 330 transfers disc tray 310 to the inside or the outside of body 100.

Disc deck rotating apparatus 390 is slidably connected with one side of the inside of body 100 and rotated simultaneously with transfer of disc tray 310 to transfer disc deck 320 to a loading position.

Disc deck rotating apparatus 390 has a disc deck transferring plate 391 successively moved with disc tray transferring apparatus 330 and an disc deck auxiliary transferring plate 396 formed to be bent from disc deck transferring plate 391 down of the vertical. Disc deck transferring plate 391 is provided with a rack 392 formed along the right and left directions of the front of disc deck 320 so that disc deck 320 can be slidably moved to the right and left. Disc deck auxiliary transferring plate 396 is extended to be bent down vertically from transferring plate 391, and having a sloped groove 397 formed with a predetermined slope on auxiliary transferring plate 396. Disc deck rotating apparatus 390 is located such that disc deck transferring plate 391 of disc deck rotating apparatus 390 is arranged at the upper surface of the front of disc deck 320 from which the disc is to be inserted, and disc deck auxiliary transferring plate 396 extended to be downwardly bent from transferring plate 391 is arranged at the side surface of disc deck 320. Disc deck 320 is provided with a disc deck transferring projection 321 projected from a side of disc deck 320, disc deck transferring projection 321 can be slidably transferred along the sloped groove 397 of disc deck rotating apparatus 390, and thus rotates disc deck 320.

Meanwhile, transferring plate 391 of disc deck rotating apparatus 390 has a guide rod 392 projected thereon. Disc tray 310 has a guide rail 393 at a position corresponding with guide rod 392 on the lower surface thereof.

Guide rail 393 is formed with a rectilinear groove 394 and an orthogonal groove 395 extended to be vertically bent from rectilinear groove 394.

A reference numeral 250 denotes a bracket for supporting cassette tape holder 220, this bracket 250 has guide groove 251 for placing cassette tape holder 220 on tape recorder deck 210 of tape driving part 200 at one side thereof.

Hereinafter, the operation of the disc player having the above construction will be described.

Referring to FIG. 1, the disc is placed on the upper surface of disc tray 310 in the state that disc tray 310 is transferred to the outside direction of body 100, which is sensed by microprocessor, etc. (not shown) to drive the driving motor M of the upper surface of disc deck 320. Thus, the first gear group 360 belt pulley connected with driving motor M is driven to be rotated simultaneously with this driving of the driving motor M. At the same time, the second gear group belt pulley connected with first gear group 360 is driven to be rotated, and the third gear group 380 belt pulley connected with second gear group 370 is driven to be rotated.

When the third gear group 380 is rotated, disc tray 310 is slid toward the inside of body 100 by disc tray transferring rack 331 formed on the lower surface of disc tray 310 engaged with gear 381 of third gear group 380. Thus, when disc tray 310 is transferred to the predetermined position, disc tray transferring rack 331 formed on the lower surface of disc tray 310 is engaged with gear 371 of second gear group 370 to be subsequently transferred to the position contacted with disc deck 320.

During sliding transference of disc tray 310 to the inside of body 100 by driving motor M and the first, second, and third gear groups 360, 370, and 380, disc tray 310 is smoothly and precisely slid by guide groove 311 formed on the lower surface of disc tray 310 and guide projections 150, 150 . . . formed on upper surface of disc deck 320 and on both sides of upper surface of right and left guide plates. Particularly, guide projections 150, 150 . . . preferably have lozenge shapes to smoothly transfer disc tray 310.

Thus, disc tray 310 is slidingly transferred to the inside of body 100 to reach the position contacted with disc deck 320. Guide rod 392 projected from disc deck transferring plate 391 formed on one side surface of disc deck 320 is slidingly transferred along guide rail 393 formed on the side of the lower surface of disc try 310. At this time, guide rod 392 is slidingly transferred along rectilinear groove 394 and an orthogonal groove 395 extended to be vertically bent from rectilinear groove 394. When guide rod 392 is slidingly transferred along orthogonal groove 395 of guide rail 393, guide rod 392 is biased to the left as shown in the drawings, and therefore, disc deck transferring plate 391 is slidingly transferred to the left. As above mentioned, when disc deck transferring plate 391 is slidingly transferred to the left, disc deck transferring rack 392 formed at one side end of disc deck transferring plate 391 is engaged with gear 362 of the first gear group 360 to be subsequently rotated.

Meanwhile, as above mentioned, disc deck transferring plate 391 is slidingly transferred, and at the same time, transferring projection 321 of disc deck 320 inserted into sloped groove 397 of disc deck auxiliary transferring plate 396 formed to be bent from disc deck transferring plate 391 down of the vertical is upwardly transferred along sloped groove 397, and as a result, disc deck 320 is rotated centering around the one side of body 100. Thus, the transferring of disc tray 310 is completed, and at the same time, disc deck 320 is rotated to clamp disc tray 310 by clamper (not shown), etc..

On the other hand, in the case of recording/reproducing of the cassette tape, referring to FIG. 4, the cassette tape is inserted through inserting opening 110 of body 100 and cassette tape holder 220 of tape driving part 200 installed at the front part of inside of body 100. Thus, holder 220 which the cassette tape is inserted is slidingly transferred along guide groove 251 of bracket 250 to be placed on tape recorder deck 210, thereby recording/reproducing of the cassette tape becomes possible.

In accordance with the united recording/reproducing device of the present invention, it is possible that the recording and/or playback operations is carried out by inserting the disc or the tape through the single inserting part. More particularly, in the transferring apparatus which the stroke of the long distance is required, due to the use of belt, the size of the entire set is compactized, its construction is simplified, and thus the production cost can be down.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A united tape and disc recording/reproducing device having a united inserting part comprising:

a body having an inserting part provided at a front side of said body for inserting a cassette tape and an optical disc;

a tape driving part having a tape recorder deck and holder, the tape recorder deck being provided with a running system having a head drum at an inside of said body and said holder being provided for placing the tape on said tape recorder deck; and, a disc driving part having a disc tray, a disc deck, disc tray transferring means, and disc deck rotating means, said disc tray being provided for receiving the disc, said disc deck being provided for placing the disc transferred by said disc tray on said disc deck, said disc tray transferring means being provided with gear groups installed on said disc deck and said body and a rack formed at said disc tray to be engaged with said gear groups, and said disc deck rotating means being rotatably connected to a side of the interior of said body and being rotated simultaneously with transferring of said disc tray to transfer said disc deck to a loading position, wherein said disc tray transferring means comprises a first gear group having a driving motor and a plurality of gears rotated by the driving motor; a second gear group installed on a path of the disc tray to be transferred, said second gear group in order to transfer said disc tray to an inside or outside of said body; a third gear group installed at spaced position with the second gear group on a path of the disc tray to be transferred, said third gear group belt pulley connected with the second gear group to be rotated by them; a rack formed on lower surface of said disc tray along a transferring direction of the disc tray to be engaged with said first, second, and third gear groups, whereby the disc tray transferring means transfers said disc tray to the inside or an outside of said body.

2. A united tape and disc recording/reproducing device having a united inserting part comprising:

a body having an inserting part provided at a front side of said body for inserting a cassette tape and an optical disc;

a tape driving part having a tape recorder deck and holder, the tape recorder deck being provided with a running system having a head drum at an inside of said body and said holder being provided for placing the tape on said tape recorder deck: and, a disc driving part having a disc tray, a disc deck, disc tray transferring means, and disc deck rotating means, said disc tray being provided for receiving the disc, said disc deck being provided for placing the disc transferred by said disc tray on said disc deck, said disc tray transferring means being provided with gear groups installed on said disc deck and said body and a rack formed at said disc tray to be engaged with said gear groups, and said disc deck rotating means being rotatably connected to a side of the interior of said body and being rotated simultaneously with transferring of said disc tray to transfer said disc deck to a loading position, wherein said disc deck rotating means comprises a transferring plate and an auxiliary transferring plate, said transferring plate being successively moved with said disc tray transferring means, being provided at an upper surface of the front of the disc deck, and having a rack formed along the right and left directions of the front of the disc deck so that said disc deck can be slidably moved to the right and left, and said auxiliary transferring plate being formed to be bent from said transferring plate, and having a sloped groove formed with a predetermined slope on the auxiliary transferring plate, thereby transfers said disc deck to a loading position;

said disc deck being provided with disc deck transferring projection projected from a side of the disc deck so that said disc deck can be slidably transferred along the sloped groove on the auxiliary transferring plate.

3. A united tape and disc recording/reproducing device. having a united inserting part according to claim 2, wherein said transferring plate has a guide rod projected thereon, and said disc tray has a guide rail formed with a rectilinear groove and an orthogonal groove extended from the rectilinear groove, said rectilinear groove being installed at a corresponding position to the guide rod such that the guide rod can be rectilinearly moved along the transferring direction of the disc tray, and said orthogonal groove being extended from said rectilinear groove to be bent in an orthogonal state with said rectilinear groove, thereby the more stable transference of the disc tray and the disc deck can be achieved.

4. A united recording/reproducing device comprising:

a body having an inserting part provided at a front side of the body for inserting a cassette tape and an optical disc;

a tape driving part having a tape recorder deck and holder, said tape recorder deck being provided with a running system having a head drum at an inside of the body and said holder being provided for placing the tape on said tape recorder deck; and, a disc driving part having a disc tray, a disc deck, disc tray transferring means, and disc deck rotating means, said disc tray being provided for receiving the disc, said disc deck being provided for placing the disc transferred by said disc tray on said disc deck, said disc tray transferring means being provided with gear groups installed on said disc deck and said body and a rack formed at said disc tray to be engaged with said gear groups, and said disc deck rotating means being rotatably connected to a side of the interior of said body and being rotated simultaneously with transferring of said disc tray to transfer said disc deck to a loading position;

said disc tray transferring means having a first gear group having a driving motor and a plurality of gears rotated by the driving motor; a second gear group installed on a path of the disc tray to be transferred, said second gear group in order to transfer said disc tray to an inside or outside of said body; a third gear group installed at spaced position with the second gear group on a path of the disc tray to be transferred, said third gear group belt pulley connected with the second gear group to be rotated by them; a rack formed on lower surface of said disc tray along a transferring direction of the disc tray to be engaged with said first, second, and third gear groups;

said disc deck rotating means having a transferring plate and an auxiliary transferring plate, said transferring plate being successively moved with said disc tray transferring means, being provided at an upper surface of the front of the disc deck, and having a rack formed along the right and left directions of the front of the disc deck so that said disc deck can be slidably moved to the right and left, and said auxiliary transferring plate being formed to be bent from said transferring plate, and having a sloped groove formed with a predetermined slope on the auxiliary transferring plate, thereby transfers said disc deck to a loading position;

said disc deck being provided with disc deck transferring projection projected from a side of the disc deck so that said disc deck can be slidably transferred along the sloped groove on the auxiliary transferring plate.

5. A united tape and disc recording/reproducing device having a united inserting part according to claim 1, wherein the device alternatively comprises guide grooves or guide projections on both sides of lower surface of said disc tray and on upper surface of said disc deck corresponding with said both sides for guiding a transference of said disk tray.

6. A united tape and disc recording/reproducing device having a united inserting part according to claim 5, wherein the guide projections have lozenge shape in order to smoothly transfer said disc tray.

7. A united tape and disc recording/reproducing device having a united inserting part according to claim 1, wherein the device alternatively comprises guide grooves or guide projections on both sides of lower surface of said disc tray and on right and left guide plates of said body corresponding with said both sides for guiding a transference of said disk tray.

8. A united tape and disc recording/reproducing device having a united inserting part according to claim 7, wherein the guide projections have lozenge shape in order to smoothly transfer said disc tray.

9. A united tape and disc recording/reproducing device having a united inserting part according to claim 2, wherein the device alternatively comprises guide grooves or guide projections on both sides of lower surface of said disc tray and on upper surface of said disc deck corresponding with said both sides for guiding a transference of said disk tray.

10. A united tape and disc recording/reproducing device having a united inserting part according to claim 9, wherein the guide projections have lozenge shape in order to smoothly transfer said disc tray.

11. A united tape and disc recording/reproducing device having a united inserting part according to claim 2, wherein the device alternatively comprises guide grooves or guide projections on both sides of lower surface of said disc tray and on right and left guide plates of said body corresponding with said both sides for guiding a transference of said disk tray.

12. A united tape and disc recording/reproducing device having a united inserting part according to claim 11, wherein the guide projections have lozenge shape in order to smoothly transfer said disc tray.

* * * * *